United States Patent [19]

Wiener

[11] 4,143,852
[45] Mar. 13, 1979

[54] REUSABLE GASKET FOR USE IN AND IN COMBINATION WITH A MOLDING APPARATUS

[76] Inventor: Robert Wiener, 3985 Goveneur Ave., New York, N.Y. 10463

[21] Appl. No.: 647,188

[22] Filed: Jan. 7, 1976

[51] Int. Cl.² .............................................. B29C 1/04
[52] U.S. Cl. .............................. 249/135; 249/187 R; 277/228
[58] Field of Search ................ 277/228; 249/134, 135, 249/112, 115, 116, 82, 114, 113, 187; 164/72; 425/808; 65/24, 26, 374 RM, 374 M; 427/133, 135

[56] References Cited

U.S. PATENT DOCUMENTS

| | | | |
|---|---|---|---|
| 1,180,876 | 4/1916 | Pease | 65/374 RM X |
| 1,635,482 | 7/1927 | Joyce | 277/228 X |
| 2,205,910 | 6/1940 | Raybould | 277/228 X |
| 2,442,369 | 6/1948 | McBride | 277/228 X |
| 2,994,161 | 8/1961 | Bair | 425/808 X |
| 3,648,965 | 3/1972 | Daddona | 249/134 |
| 3,881,683 | 5/1975 | Whitney | 425/808 X |

Primary Examiner—Richard B. Lazarus
Assistant Examiner—Mark Rosenbaum
Attorney, Agent, or Firm—James A. Wong

[57] ABSTRACT

A reusable gasket for use in and in combination with a molding apparatus for casting articles of acrylic monomer plastic or the like. The gasket comprises a mold and casting release surface for contact with a cast plastic article and the two mold surfaces and includes a core of elastomeric material completely, but loosely encased in a tube impervious to passage therethrough by the material of the core and the material of the plastic article to be cast. The impervious tube may be of polytetrafluoroethylene, polyamide, polyethylene, or like material. The mold and casting release surface is preferably silver. A plurality of gasket members are placed in end-to-end relationship between a pair of plate members in a molding apparatus to define a casting cavity. A plug in the form of a wedge may be used to close a gap between adjacent ends of two gasket members through which casting material may be flowed into the cavity prior to closing the gap.

10 Claims, 6 Drawing Figures

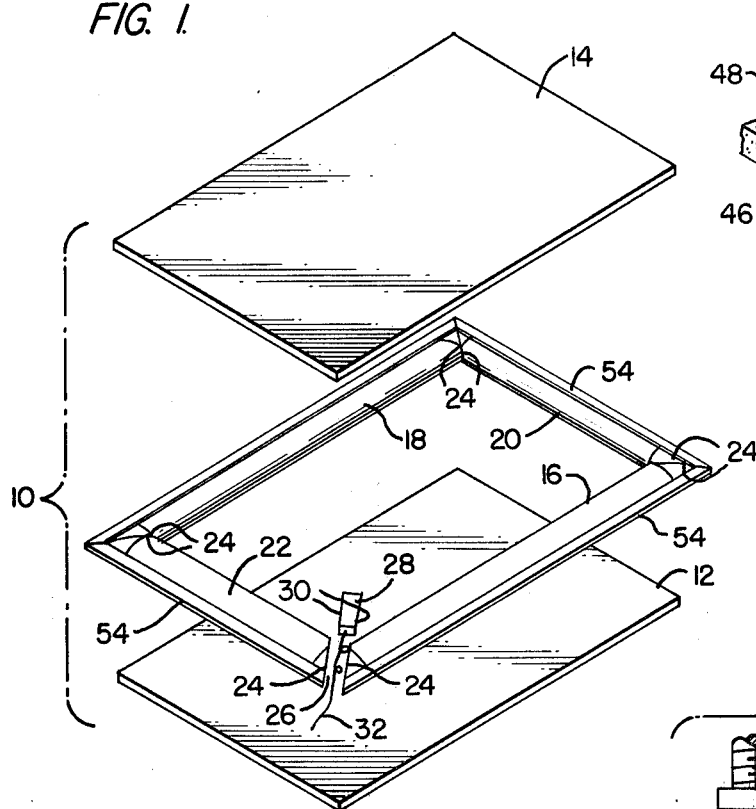
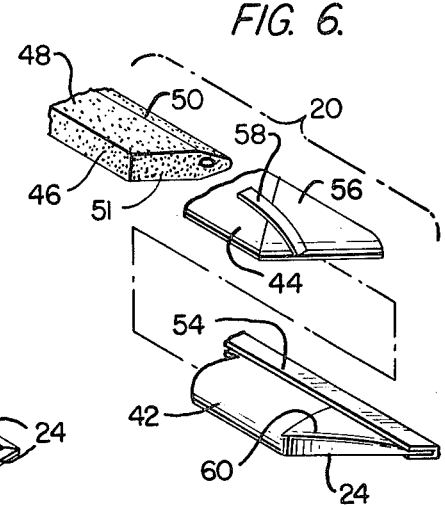
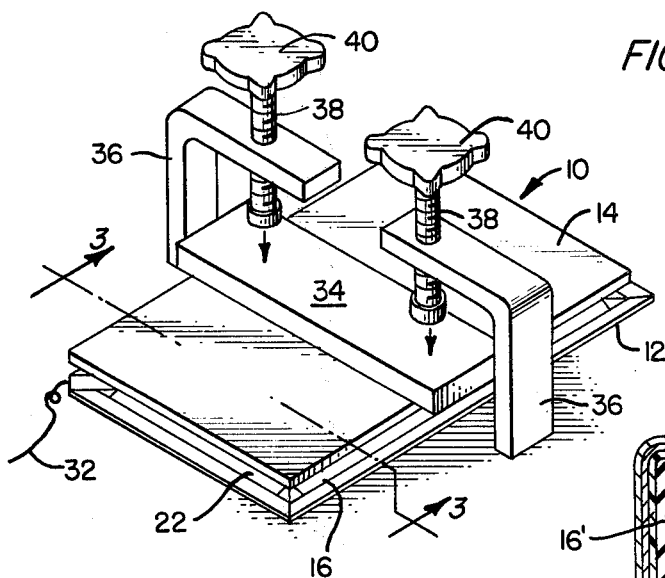
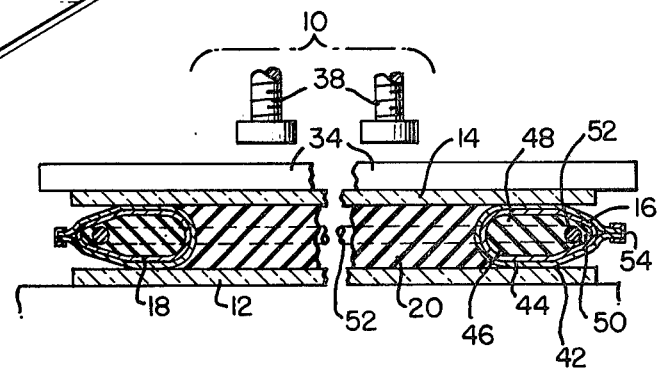
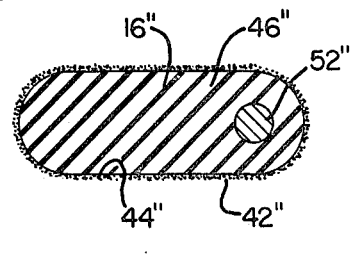
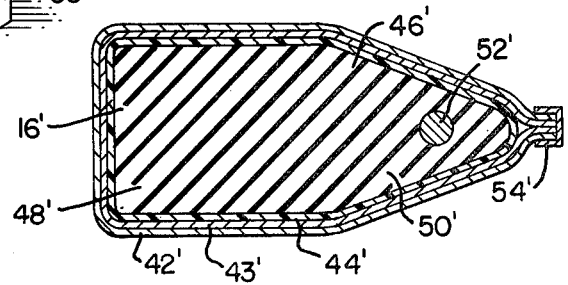

REUSABLE GASKET FOR USE IN AND IN COMBINATION WITH A MOLDING APPARATUS

BACKGROUND OF THE INVENTION

1. Field of the Invention

The present invention relates to a gasket for use in and in combination with a molding apparatus for casting articles out of plastics such as acrylic monomer or the like. More particularly, this invention relates to a new and improved gasket construction that is easier to use and further is imbued with a significantly greater operational life than those presently known in the prior art.

2. Description of the Prior Art

In the prior art processes for casting plastic articles out of acrylic monomer material or the like and more particularly for casting flat sheets, a monomer or a partial polymer of synthetic resin is introduced into a cavity defined by two generally horizontal parallel plates of glass, metal or other smooth inert material and gasket members disposed between the plates and adjacent the periphery thereof. In the known prior art molding apparatuses, the gaskets are compressed between the plates to allow for shrinkage of the polymerizing sheet without separation of the sheet from the mold surface. Compression of the gasket between the plates or molding surfaces is achieved by use of a press or clamping device during the polymerization and curing phase of the product to obtain a uniformly solid sheet.

The known prior art gaskets in use frequently, because of their composition, such as rubber, both natural and synthetic, suffer a breakdown during the casting operation whereupon certain particles migrate into the casting cavity and contaminate the sheet to be cast as well as to provide a sheet having voids or sink holes therein. Moreover, the prior art gaskets frequently adhere to the glass plates and/or the cast sheet so that separation therefrom is difficult. Prior art gaskets further frequently subject the operator of the molding apparatus to severe shock due to static electricity on separation of the glass plates defining the cavity from the molded sheet.

SUMMARY OF THE INVENTION

With the background of the present invention outlined above, it may be summarized as a new and improved gasket construction for use in and in combination with a molding apparatus in the casting of articles out of plastic materials such as acrylic monomer or the like.

A principal object of the present invention is to provide a gasket construction for use in casting plastic articles wherein the gasket will readily separate from the cast article and from the molding apparatus.

Another object of the present invention is to provide a gasket that is inert to the material with which it comes in contact during the molding process.

Still another object of the present invention is to provide a reusable gasket that is dimensionally stable and yet compressible under casting conditions to allow for polymerization shrinkage during curing and that will fully recover its original form after repeated use in casting operations.

Yet another object of the present invention is to provide a new and improved gasket construction which will relieve an operator of a molding apparatus from shock from static electricity frequently discharged when the glass plates of the apparatus are separated to remove the casting.

Briefly, the above objects are achieved in providing a gasket with an exterior contact surface that is metallic to act as a non-adhering, mold and product release agent. Silver has been found to provide optimum results as a mold release agent, although nickel, copper and aluminum have also been used with acceptable results. Beneath the metallic contact surface of the gasket, an elastomeric core is loosely disposed which is resiliently compressible. An intermediate tubular member of impervious material is disposed between the metallic material of the gasket and the elastomeric core member to preclude migration of foreign matter from the core member to the casting ingredients and vice versa.

BRIEF DESCRIPTION OF THE DRAWING

FIG. 1 represents an exploded view in perspective of gasket construction according to the present invention in combination with a molding apparatus;

FIG. 2 represents a view in perspective of the molding apparatus and gasket construction as assembled and in use to cast a sheet or like plastic product;

FIG. 3 represents a sectional view on an enlarged scale taken along the plane 3—3 in FIG. 2 with portions broken away and omitted for convenience;

FIG. 4 represents an alternative embodiment of the gasket construction according to the present invention and similar to that in the right hand portion of FIG. 3 but on a further enlarged scale for clarity of details;

FIG. 5 represents a further alternative embodiment of the gasket construction similar to that in FIG. 4 but on a slightly reduced scale; and FIG. 6 represents an exploded view in perspective of a portion of one of the gasket members in FIG. 1.

DETAILED DESCRIPTION OF THE INVENTION

Referring now in particular to the drawing, the reader will readily appreciate one form of the present invention as being embodied and illustrated in FIGS. 1-3 and 6 in which a molding apparatus 10 for casting plastic articles in sheet form, for example. As illustrated the molding apparatus 10 comprises first and second plates 12, 14, preferably of glass disposed one above the other in parallel relationship to each. A plurality of gasket members 16, 18, 20, 22 are disposed on plate 12 and together define a casting cavity with plate 12 and plate 14 which in the assembled molding apparatus 10 is lowered onto gasket members 16, 18, 20, 22 and spaced thereby from plate 12. The gasket members 16, 18, 20, 22 are arranged in end-to-end relationship to define a rectangular space, for example. It is clear, however, that the molding cavity defined by gasket members need not be rectangular, but instead may be triangular, pentagonal or of any desired shape.

From FIG. 1 it is clearly seen that each gasket member 16, 18, 20, 22 is provided with a bevelled or mitered end 24 adapted to abut against an adjacent edge of a gasket or like member to cooperatively seal the molding cavity from the atmosphere. An opening 26, as may be seen in FIG. 1, is provided between adjacent ends 24 of gasket members 16 and 22 through which ingredients of the material to be cast may be introduced. The opening 26 may be formed by gasket member 22 slightly shorter than gasket member 20, for example. In FIG. 2, gasket member 22 is in contact with gasket member 16 so that the opening 26 would be between the adjacent ends of gasket members 18 and 22. After the desired amount of casting ingredients have been introduced into the casting cavity through opening 26, this opening 26 may be closed by a wedge closure plug 28 with opposite sides 30 commensurate with the angle of ends 24 of gasket members 16 or 18 and 22. Plug 28 is disposed within the casting cavity with a cord 32 attached thereto and extending out through opening 26 whereby it will be accessible to the exterior of molding apparatus 10 and may be pulled outwardly to close opening 26. To ensure continuity in sealing and in other aspects, plug 28 is structurally similar to the other gasket members, differing therefrom only in size and by the addition of cord 32 attached thereto.

Light pressure may be applied to plates 12, 14 prior to introduction of casting ingredients through opening 26 and into the molding cavity by placing one or more pressure boards 34 over one plate 14 and applying pressure thereto by press or clamp devices 36, which may include screws 38 and handles 40. It is clear that upon rotation of handles 40 to apply a light pressure to plate 14 the gasket members 16, 18, 20, 22 will be pressed against plate 12 to provide a sealing effect and if the gaskets are of compressible material, as has been stated above, the adjacent ends of the gaskets members in particular those ends 24 that are arranged in abutting relationship will provide a sealing condition thereat.

A significant feature of the present invention resides in the provision of a reusable gasket having a non-adhering, product and mold release agent on its external surface which surface in use is placed in contacting relationship against the molding surfaces of the molding apparatus 10, subjected to compression and is capable of recovery to original form. This non-adhering, product and mold release agent is embodied in a thin layer of metallic foil, coating or plating 42 on the exterior of each gasket member 16 as may be seen in FIG. 3. It is clear that a similar metallic coating or plating is provided on gasket member 18, 20, and 22. Nickel and copper has been found to be satisfactory when used as the foil, coating or plating material 42 to function as a release agent; silver, however, has been found to provide the optimum results as a release agent. The gasket member 16 includes an elastomeric core member 46 which is compressible under pressure to effect sealing of the molding apparatus 10 and yet recover its original shape upon dissipation of pressure. The material of the core member 46 may be of silicone rubber, for example. Use of elastomers having a hardness of about 30 durometer has been found to be satisfactory. Interposed between core member 46 and the mold release foil, coating or plating 42 is an impervious tubular member 44 completely, but loosely surrounding core member 46 to preclude migration of material or ingredient therethrough in either direction to thus mutually protect both the core member 46 and the casting ingredients from contaminating each other. Suitable material for tubular member 44 include polytetrachloroethylene, polyamide, polyethylene or the like. Tubular member 44 is disposedloosely around core member 46 so that the two will deform independently of each other while under compression so as not to be distorted and torn up as where such members might be damaged if bonded to each other and stressed together under pressure.

As may be seen in FIGS. 3 and 6, core member 46 in cross section may be generally trapezoidal and include a main body portion 48 and a taper edge portion 50 which is directed outwardly from the molding apparatus 10. A rod 52 of metal, for example, is disposed in the taper edge portion 50 and extends for the length thereof to provide a degree of stability thereat. Thus, while under pressure the gasket member 16 will have a tendency to deform evenly within the molding apparatus and along the edges of taper portion 50 on opposite sides of rod 52.

Tubular member 44 includes at least one open end through which core member 46 is inserted and loosely held therein after which such open end of the tubular member is folded over bevel edge 51 of core member 46 at 56 and secured, for example, by a strip of tape 58 to completely encase core member 46 therein. After both ends of tubular member 44 are closed, the gasket member subassembly may then be wrapped or enclosed in a metallic foil 42 or the like which is functional as a casting and mold release agent. It is, of course, significant that the metallic foil 42 be extremely thin so that it, too, will be yieldable upon application of pressure thereon. Adjacent edges of wrapped foil 42 may be secured by tape 54, staples or other means. Opposite ends of wrapped foil 42 may also be folded over at 60 and tucked under tape 54 or otherwise secured.

In an alternative embodiment, the gasket according to the present invention may take the form 16' of FIG. 4 wherein core member 46' is also generally trapezoidal in cross section with a main body portion 48' which would be directed inwardly in the molding apparatus and a taper edge portion 50' to be directed outwardly of the molding apparatus. Edge portion 50' may also include a reinforcing or stabilizing rod 52' extending therethrough over the length thereof. The non-adhering casting and mold release surface 42' of gasket member may be a coating or plating of metal such as silver, nickel, aluminum, copper, or other metal, but silver is preferred in that it provides the best results. Because of the high cost of silver, however, it has been found expedient to form the release agent 42 as an extremely thin layer of silver either as a plating, coating or foil on a backing layer 43' of aluminum or copper. Moreover, a thin layer of paper or like material may be substituted for backing layer 43' or adhered thereto internally thereof. Tape 54' is illustrated as means for securing adjacent edges of the web forming the mold release agent 42' in a manner similar to the embodiment of FIG. 3. Also, a tubular member 44' of polytetrafluoroethylene, polyamide, polyethylene or like material is provided to completely but loosely surround the elastomeric core member 16' in a manner similar to that described in connection with the embodiment of FIG. 3. It is further within the contemplation of the present application to use a layer of polytetrafluoroethylene, polyamide, polyethylene or like material backing on which mold release agent 42' may be adhered.

Another alternative embodiment of the present invention may be realized in FIG. 5 in which a gasket member 16" comprises an elastomeric core member 46" having rounded lateral edges and a reinforcing rod 52" extending for substantially the entire length thereof adjacent an edge to be situated or directed outwardly of the molding apparatus. A tubular member 44" of polytetrafluoroethylene, polyamide, polyethylene or like material is provided completely, but loosely around core member 46". A thin layer 42" of metal such as silver, copper, nickel or aluminum is adhered to the outer surface of tubular member 44" to serve as a non-adhering mold and casting release agent.

Additional advantages obtained from use of the various forms of gasket members disclosed hereinabove include improvements in curing of the casting in that sinking, laking are avoided in the final product as a result of soft corners provided in the gasket arrangement which allow for evenly distributed expansion and shrinkage with continuous balanced support of glass plate 14 throughout the entire casting operation.

As mentioned above, silver provides the best result as a mold and casting agent, this has been found to be true in use in that it just seems to work better than nickel, cooper, aluminum, or other metals used. The use of metal as a mold release agent has also yielded collateral advantages among which anti-shock producing has been noted in contrast to shock encountered in the use of known prior art gaskets. The anti-shock characteristic resulting from the use of the disclosed gasket construction of the present invention apparently is the result of discharge of static electricity through the metallic mold release surfaces of the gasket members which provide a natural ground.

While several embodiments of the present invention have been illustrated and described herein, numerous other variations or modifications thereof may occur to those having skill in the art and what is intended to be covered herein is not only the illustrated forms of the invention, but also any and all modified forms thereof as may come within the spirit of said invention.

I claim:

1. A reusable gasket for use between a pair of glass plates or like members of a static molding apparatus to seal an edge of a cavity in the molding apparatus in which a plastic sheet may be cast, said gasket comprising mold release means providing external surface portions which in use may be in sealing engagement with mold members, also be in contact with a plastic sheet to be cast, and be effective as a natural ground with respect to static electricity between the glass plates or like members, whereby personnel will not be subjected to shock from static electricity and the glass plates or like members may be readily separated to obtain access to the finished product, and a core member of elastomeric material enclosed within said mold release means, wherein said external surface portions of said mold release means is of silver material and will not adhere to and will freely separate from a plastic article to be cast and from the plate or like members for defining the walls of a molding apparatus in which such an article may be cast, wherein said gasket includes an inner layer of backing material and said mold release means which is of silver material is adhered on said backing material externally thereof.

2. The gasket as defined in claim 1 in which said mold release means further includes an intermediate layer of copper foil bonded to said inner layer of backing material with said silver material plated on said layer of copper.

3. The gasket as defined in claim 1 further including means impervious to passage therethrough by the material of said core member and by the material of the plastic sheet to be cast completely, but loosely encasing said core member, said encasing means being disposed internally of said mold release means.

4. The gasket as defined in claim 3 wherein said encasing means is formed from a sheet consisting of polytetrafluoroethylene, polyamide, polyethylene, or like material.

5. The gasket as defined in claim 3 wherein said core member is generally elongate and includes in transverse cross section a main body portion and an outwardly directed portion when used in a mold.

6. The gasket as defined in claim 3 wherein said core member is generally trapezoidal in cross section with a wedge portion to be directed outwardly from the interior of an assembled molding apparatus.

7. The gasket as defined in claim 6 wherein opposite ends of said core member are bevelled or mitered for mating and sealing contact with adjacent ends of similar gasket members in forming an enclosed cavity.

8. The gasket as defined in claim 7 wherein a rod of relatively rigid material extends within said core member for the length thereof.

9. A combination of the gasket of claim 8 and a plurality of similar gaskets disposed on a first glass plate or like member in end-to-end arrangment to define a closed area and a second glass plate or like member disposed over all of said gaskets to form a closed cavity in a static mold.

10. The combination of claim 9 wherein adjacent ends of two of said gasket form an opening through which raw material may be introduced and including a wedge plug having a pull string extending out of said opening which may be pulled outwardly to close said opening.

* * * * *